US009469243B2

(12) United States Patent
Omura et al.

(10) Patent No.: US 9,469,243 B2
(45) Date of Patent: Oct. 18, 2016

(54) LIGHTING DEVICE

(71) Applicant: TOYOTA BOSHOKU KABUSHIKI KAISHA, Aichi-ken (JP)

(72) Inventors: Naomi Omura, Aichi-ken (JP); Masanori Sekiya, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 99 days.

(21) Appl. No.: 14/285,756

(22) Filed: May 23, 2014

(65) Prior Publication Data

US 2015/0003093 A1    Jan. 1, 2015

(30) Foreign Application Priority Data

Jun. 28, 2013    (JP) ................................ 2013-136228

(51) Int. Cl.
| | | |
|---|---|---|
| *F21S 4/00* | (2016.01) | |
| *B60Q 3/00* | (2006.01) | |
| *B60Q 3/02* | (2006.01) | |

(52) U.S. Cl.
CPC ............. *B60Q 3/004* (2013.01); *B60Q 3/0203* (2013.01); *B60Q 3/0216* (2013.01); *B60Q 3/0289* (2013.01)

(58) Field of Classification Search
CPC ... B60Q 3/004; B60Q 3/0216; B60Q 3/0233
USPC ................................................. 362/565, 501
See application file for complete search history.

(56) References Cited

U.S. PATENT DOCUMENTS 6,550,946 B2 *    4/2003  Misawa  ............... B60Q 3/0233
                                                  362/100
8,356,921 B2 *    1/2013  Fujita  ..................... B60Q 3/004
                                                  362/488

FOREIGN PATENT DOCUMENTS

| JP | 6-075120 | 3/1994 |
|---|---|---|
| JP | 2005-306233 | 11/2005 |
| JP | 2010-070126 | 4/2010 |

* cited by examiner

*Primary Examiner* — Anh Mai
*Assistant Examiner* — Matthew Peerce
(74) *Attorney, Agent, or Firm* — Greenblum & Bernstein, P.L.C.

(57) ABSTRACT

A lighting device includes a light source, an elongated light guide member, an elongated decoration member, and a cover covering the light guide member. The decoration member includes a recess having a space to have the light guide member therein, and a linear transmissive portion. The recess has a guide member projecting toward the space and being in contact with the light guide member to guide the light guide member to a correct position. The cover covers the light guide member from the rear side and has a facing surface and a stopper extending from the facing surface toward the space and supporting the light guide member provisionally. The guide member guides the light guide member that is provisionally supported by the stopper of the cover to the correct position when the light guide member supported by the stopper of the cover is arranged in the recess.

20 Claims, 13 Drawing Sheets

LIGHTING DEVICE

CROSS REFERENCE TO RELATED APPLICATION

This application claims priority from Japanese Patent Application No. 2013-136228 filed on Jun. 28, 2013. The entire contents of the priority application are incorporated herein by reference.

FIELD OF THE INVENTION

The present disclosure relates to a lighting device.

BACKGROUND OF THE INVENTION

For example, a lighting device arranged in a vehicular interior part such as a door trim has been known. Such a lighting device provides a door trim (a base member) with lighting decoration. The door trim is a vehicular interior part of a vehicular door. Such a lighting device mainly includes an LED and a light guide member.

The light guide member is formed in a bar-like shape and has flexibility. Light from the LED enters an end surface of the light guide member, and the light is guided within the light guide member along its longitudinal direction with exiting outside through an outer peripheral surface of the light guide member. The light exiting from the light guide member transmits through a decoration member (a lens member) that is arranged to cover the light guide member and is directed to a vehicular interior side.

The decoration member is mounted to the vehicular interior part (the door trim) such that a front surface thereof faces the vehicular interior side. The decoration member includes a recess on its rear surface. The light guide member is arranged in the recess. The recess having the light guide member therein is covered with a cover member (a sealing member).

In such a lighting device, the light guide member is located between the decoration member and the cover member.

SUMMARY OF THE INVENTION

The light guide member included in such a lighting device is easily bent or warped. Therefore, it is difficult to arrange and fix the light guide member surely in a correct position in assembling the lighting device. If the light guide member is shifted from the correct position within the lighting device, unevenness may be caused in light that transmits through the decoration member (the lens member).

In such a lighting device, the light guide member is arranged between the decoration member and the cover member so as to be held therebetween. In such a configuration, if each of the decoration member and the cover member is handled independently, the light guide member may be shifted from the correct position. Therefore, practically, each of the decoration member and the cover member is not handled independently.

An objective of the present technology is to provide a technology with which a light guide member is arranged surely in a correct position between a decoration member and a cover member even with independent handling of the decoration member and the cover member included in a lighting member.

According to the present technology, a lighting device includes a light source, an elongated light guide member having an end surface which light from the light source enters and exiting light entering through the end surface, an elongated decoration member arranged along a longitudinal direction of the light guide member, and a cover covering the light guide member from the rear side with respect to the decoration member. The elongated decoration member includes a recess extending along a longitudinal direction of the decoration member and having a space therein so as to have the light guide member in the space, and a linear transmissive portion extending linearly. The recess has a guide member projecting toward the space in the recess, and the guide member is in contact with the light guide member to guide the light guide member to a correct position. The linear transmissive portion is provided along the longitudinal direction of the light guide member such that a rear side thereof faces the light guide member, and light exiting from the light guide member transmits from the rear side toward a front side of the linear transmissive portion through the linear transmissive portion. The cover covers the light guide member from the rear side with respect to the decoration member and has a facing surface facing the decoration member and a stopper extending from the facing surface toward the space in the recess and supporting the light guide member provisionally. The guide member guides the light guide member that is provisionally supported by the stopper of the cover to the correct position when the light guide member supported by the stopper of the cover member is arranged in the recess.

DETAILED DESCRIPTION OF EMBODIMENTS

First Embodiment

Figure 1:
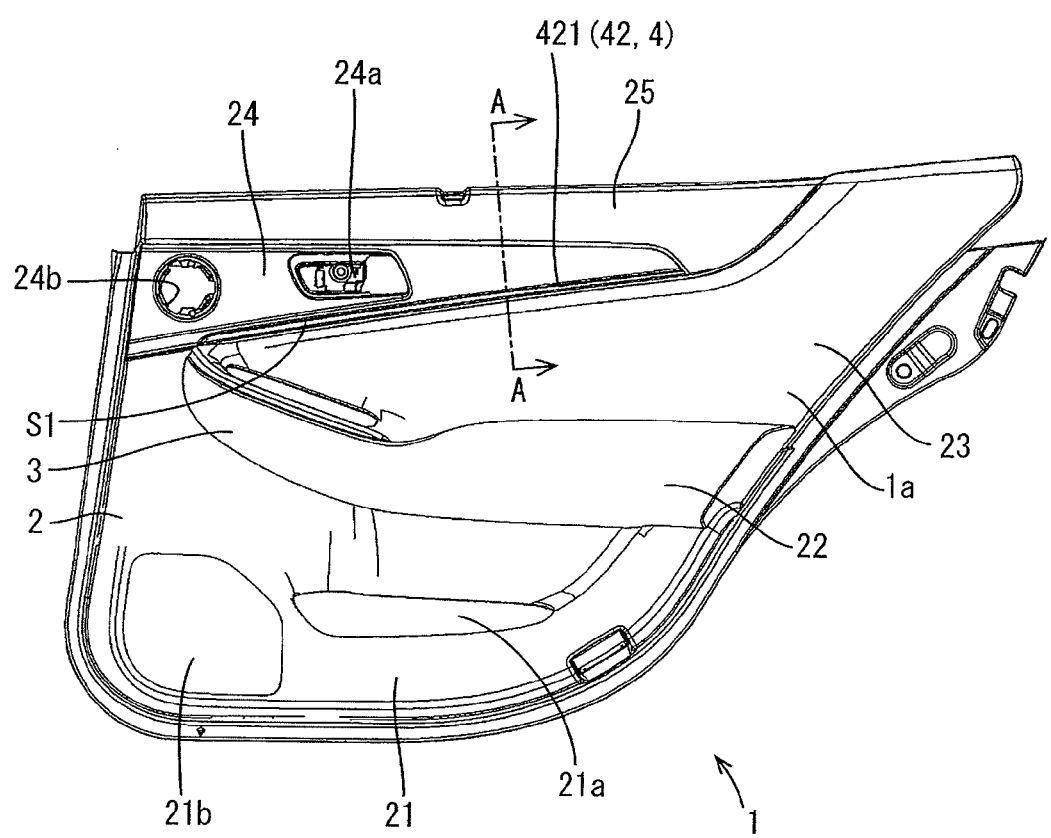
FIG. 1 is a plan view illustrating a door trim seen from a vehicular interior side.
Figure 2:
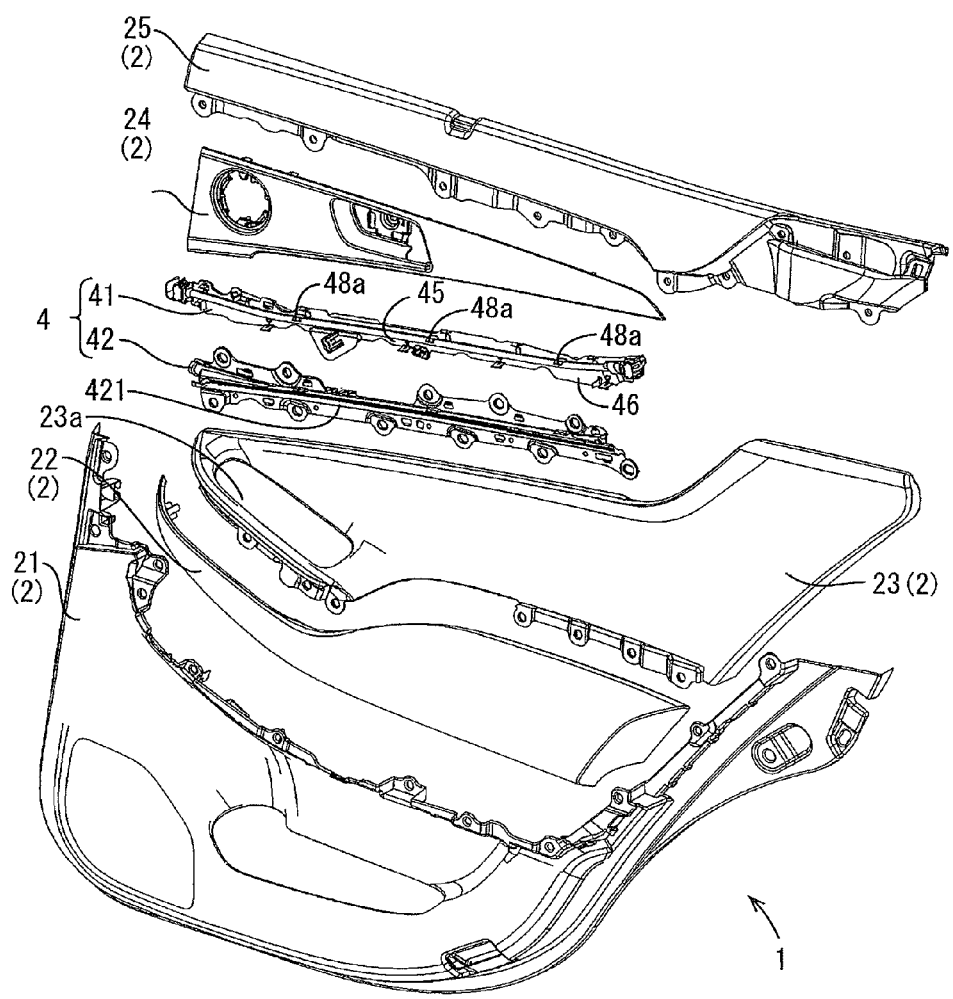
FIG. 2 is an exploded view illustrating the door trim.
Figure 3:
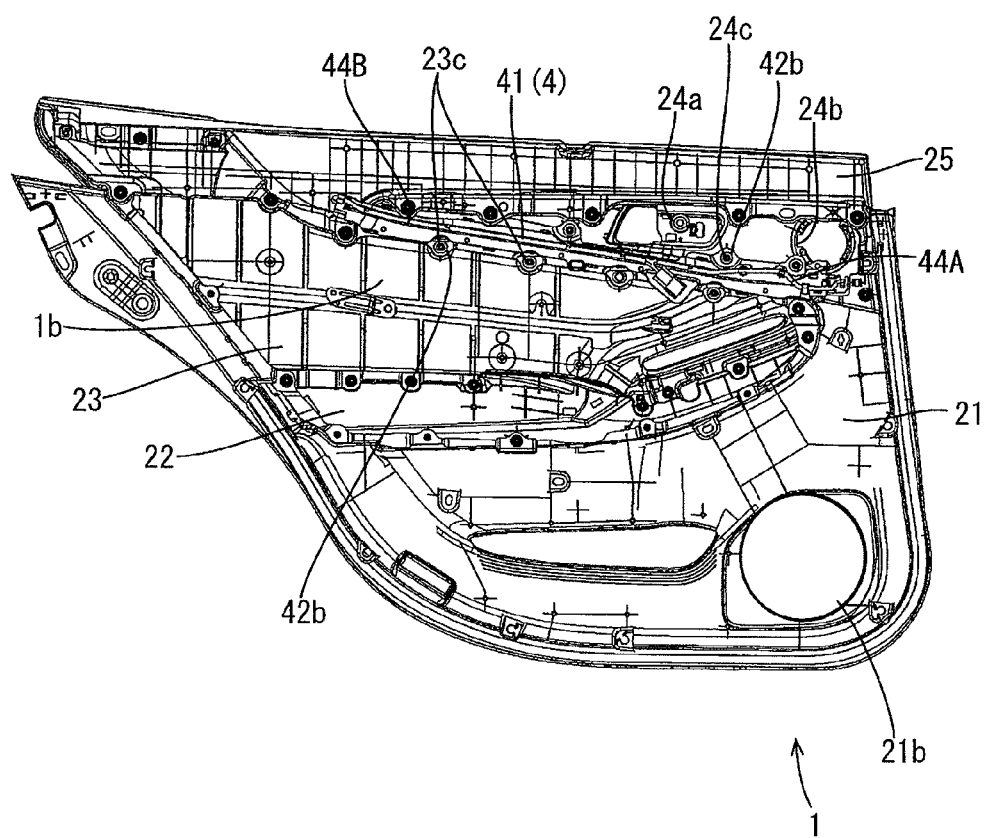
FIG. 3 is a plan view illustrating the door trim seen from a vehicular exterior side.

A first embodiment will be described with reference to FIGS. 1 to 9. In this embodiment, a door trim 1 that is an example of a vehicular interior part includes a lighting device 4. FIG. 1 is a plan view illustrating the door trim 1 seen from a vehicular interior side. FIG. 2 is an exploded view illustrating the door trim 1. FIG. 3 is a plan view illustrating the door trim 1 seen from a vehicular exterior side. A design surface (a front surface) 1a of the door trim 1 is illustrated in FIG. 1 and a rear surface 1b of the door trim 1 is illustrated in FIG. 3. A left side in FIG. 1 corresponds to a vehicular front side and a right side in FIG. 1 corresponds to a vehicular rear side. An upper-lower direction in FIG. 1 corresponds to a vehicular (compartment) upper-lower direction.

The door trim 1 configures a vehicular interior side portion of a vehicular door. The door trim 1 is mounted to a door inner panel (not illustrated) included in the vehicular door from the vehicular interior side. As illustrated in FIG. 1, the door trim 1 mainly includes a trim board 2.

The trim board 2 configures a main part of the door trim 1 and is formed in a plate shape having a predetermined thickness as a whole. For example, the trim board 2 is formed from a synthetic resin material (thermoplastic resin) such as polypropylene. A material of the trim board 2 is not necessarily a synthetic resin material but may be a mixture of a plant fiber (such as kenaf) and a synthetic resin. An armrest 3 is arranged in a middle portion of the trim board 2 (the door trim 1) to project toward the vehicular interior side as illustrated in FIG. 1.

The trim board 2 includes a plurality of parts as illustrated in FIG. 2. The trim board 2 mainly includes a lower board 21, a first armrest board 22, a second armrest board 23, a decoration board 24, and an upper board 25.

The lower board 21 mainly corresponds to a lower portion of the trim board 2. The lower board 21 includes an accommodation opening 21a for a door pocket that is a through hole. The lower board 21 includes a mounting portion 21b for receiving a first speaker (not illustrated).

The first armrest board 22 mainly corresponds to a side surface portion of the arm rest 3 that projects toward the vehicular interior side and mounted to an upper portion of the lower board 21.

The second armrest board 23 corresponds to a middle portion of the trim board 2 and a vehicular rear-side upper portion of the trim board 2. The first armrest board 21 and the second armrest board 23 configure the armrest 3. The second armrest board 23 mainly corresponds to an upper surface of the armrest 3 and is mounted to an upper portion of the first armrest board 21. The second armrest board 23 has a mount hole 23a in its vehicular front side portion. The mount hole 23a is a through hole in a vehicular upper-lower direction and a switch base (not illustrated) is mounted to the mount hole 23a. The switch base includes a switch operation part such as a switch for lifting and lowering a window glass.

The upper board 25 corresponds to an upper portion of the trim board 2 and connected to a part of the second armrest board 23 on its vehicular rear side.

The decoration board 24 mainly corresponds to a portion provided between the upper board 25 and the second armrest board 23 in a vehicular front side portion of the trim board 2. The decoration board 24 is formed in an elongated shape that extends in the vehicular front-rear direction. The decoration board 24 has a mount portion 24a in its middle portion. An inside door handle (not illustrated) is mounted to the mount portion 24a. The decoration board 24 has a mount portion 24b in its front side portion. The mount portion 24b is a through hole and a second speaker (described later) is mounted to the mount portion 24b.

A skin may be adhered to surfaces of parts (the boards 21 to 24) of the trim board 2, if necessary. Examples of materials of the skin include leather such as natural leather or synthetic leather, or a fabric such as a woven fabric, a knitted fabric, or a non-woven fabric.

The parts of the trim board 2 are mounted to each other with known mounting structures. For example, one of the parts includes a flat plate portion having a through hole therein and another one of the parts includes a tubular mounting boss that is to be inserted through the through hole. The plate portion and the mounting boss are fixed to each other by a known fixing method such as screwing or thermal swaging, and accordingly the parts are mounted to each other.

The door trim 1 includes the trim board 2 and the lighting device 4. The lighting device 4 includes a lighting main body 41 and a lighting decoration member (an example of a decoration member) 42.

Figure 4:
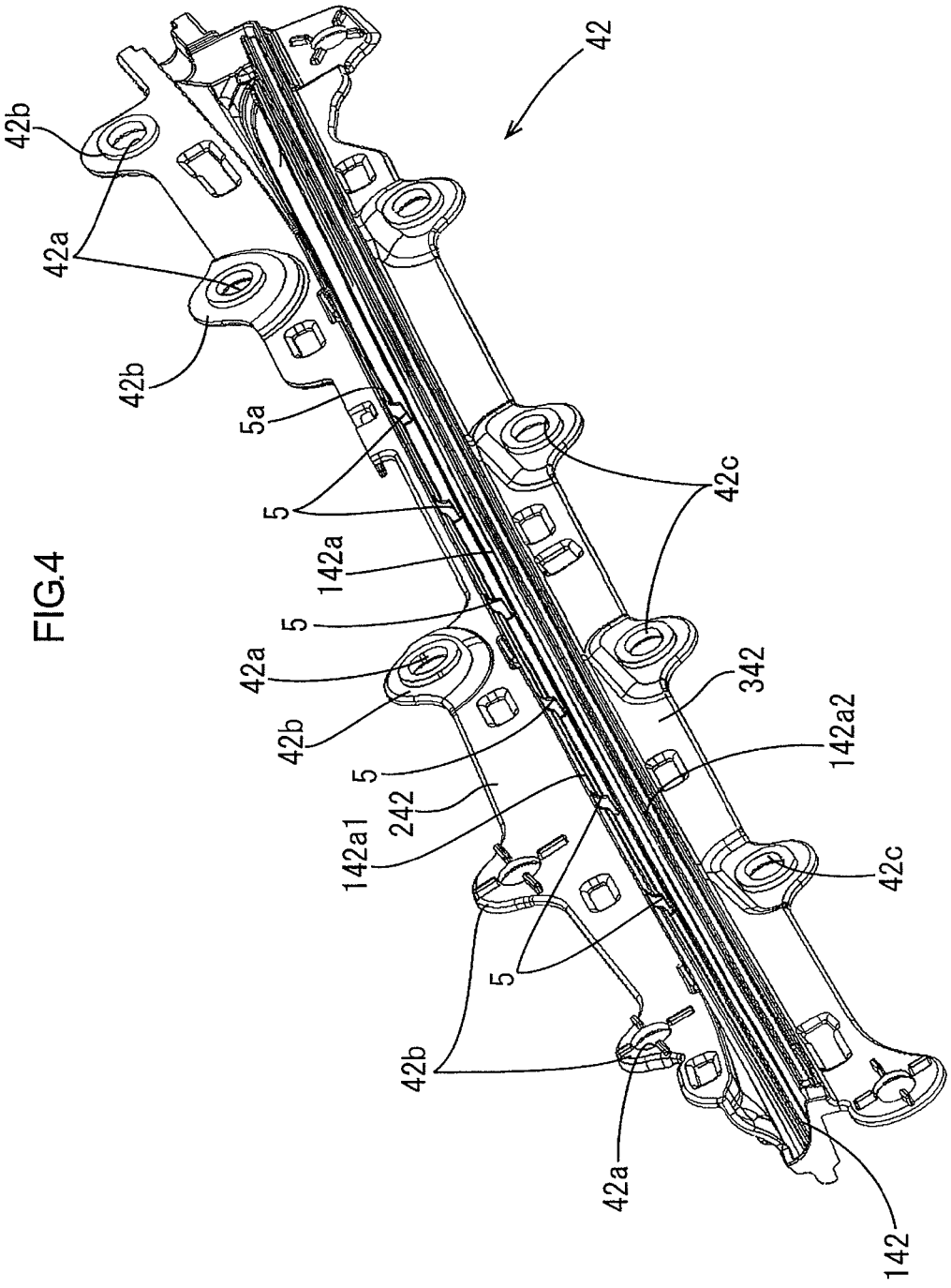
FIG. 4 is a perspective view illustrating a lighting decoration member seen from the vehicular exterior side.

FIG. 4 is a perspective view illustrating the lighting decoration member 42 seen from the vehicular exterior side. As illustrated in FIGS. 2 to 4, the lighting decoration member 42 has an elongated shape extending in the vehicular front-rear direction as a whole. The lighting decoration member 42 includes a decoration middle portion 142 that extends in the elongated direction and is formed to have a U-shaped cross section and protrude from the vehicular exterior side toward the vehicular interior side. The lighting decoration member 42 includes an upper extending plate portion 242 and a lower extending plate portion 342. The upper extending plate portion 242 extends from an upper end of the elongated decoration middle portion 142 toward the vehicular upper side. The lower extending plate portion 342 extends from a lower end of the decoration middle portion 142 toward the vehicular lower side. The upper extending plate portion 242 and the lower extending plate portion 342 extend along the vehicular front-rear direction (an elongated direction of the decoration middle portion 142). A surface of the lighting decoration member 42 that faces the vehicular exterior side corresponds to a rear side and a surface of the lighting decoration member 42 that faces the vehicular interior side corresponds to a front side.

The decoration middle portion 142 of the lighting decoration member 42 has a recess 142a on its rear side and a light guide member (that will be described later) is arranged in the recess 142a. The recess 142a is a groove that extends in the elongated direction of the lighting decoration member 42 so as to have the elongated light guide member therein. The recess 142a is open toward the vehicular exterior side and includes an upper wall portion 142a1 and a lower wall portion 142a2. The upper wall portion 142a1 is an upper side portion of the recess 142a and includes guide members 5 that project and extend inwardly therefrom toward a space of the recess 142a. As will be described later, when the light guide member that is provisionally held or supported by a cover member of the lighting main body 41, the light guide member comes in contact with the guide members 5 and the guide members 5 are in contact with an outer surface of the light guide member. Accordingly, the guide members 5 guide the light guide member into a correct position within the recess 142a.

According to the present embodiment, each of the guide members 5 has a substantially plate shape that extends inwardly from an inner surface of the recess 142a toward the space of the recess 142a. The guide member 5 corresponds to a guide plate portion having an end portion 5a (a contact surface) that is closer to the light guide member (the cover) and in contact with the light guide member when the light guide member 45 is arranged in the recess 142a. As illustrated in FIG. 4, the guide members 5 are arranged on the upper wall portion 142a1 of the recess 142a at predetermined intervals so as to be in a line along the longitudinal direction of the recess 142a. According to the present embodiment, the guide members 5 are not arranged on the lower wall portion 142a2 of the recess 142a.

As illustrated in FIG. 4, the upper extending plate portion 242 of the lighting decoration member 42 includes mount portions 42b having mount holes 42a therein. The decoration board 24 has mount bosses 24c on its rear surface, and as illustrated in FIG. 3, the mount bosses 24c are inserted through the mount holes 42a, respectively, from the vehicular interior side. The mount bosses 24c that are inserted through the mount holes 42a are fixed to the mount portions 42b by a fixing method such as thermal swaging. Accordingly, the lighting decoration member 42 and the decoration board 24 are mounted to each other. The mount bosses 24c and the mount portions 42b may not be necessarily fixed to each other via the thermal swaging but may be fixed to each other with screws.

As illustrated in FIG. 4, the lower extending plate portion 342 of the lighting decoration member 42 includes mount portions 42d having mount holes 42c therein. The second armrest board 23 has mount bosses 23c on its rear surface, and as illustrated in FIG. 3, the mount bosses 23c are inserted through the mount holes 42c, respectively, from the vehicular interior side. The mount bosses 23c that are inserted through the mount holes 42c are fixed to the mount portions 42d by a fixing method such as thermal swaging. Accordingly, the lighting decoration member 42 and the second armrest board 23 are mounted to each other. The mount bosses 24c and the mount portions 42d may not be necessarily fixed to each other via the thermal swaging but may be fixed to each other with screws.

The decoration middle portion 142 of the lighting decoration member 42 includes a linear transmissive portion 421 that extends linearly along the vehicular front-rear direction (the elongated direction of the lighting device 4). As illustrated in FIG. 1, the linear transmissive portion 421 is seen from the vehicular interior side via a space S1 formed between a lower end of the decoration board 24 and an upper end of the second armrest board 23. Light exiting from the light guide member of the lighting main body 41 transmits through the linear transmissive portion 421 to be directed toward the vehicular interior side.

The decoration middle portion 142 includes a protruding end portion that protrudes farthest to the vehicular interior side. The linear transmissive portion 421 is on the lower side from the protruding end portion of the decoration middle portion 142. The linear transmissive portion 421 is provided as a part of the lower wall portion 142a2 of the recess 142a. The linear transmissive portion 421 is a part of the recess 142a.

The lighting decoration member 42 is made of synthetic resin having high light transmission capability (high transparency) such as acrylic, polycarbonate or others. According to the present embodiment, a portion of the lighting decoration member 42 that is located on an upper side from the linear transmissive portion 421 has a light blocking layer on its surface. The light blocking layer is a light blocking coating film. The light blocking layer may be a coating film of a plating material that provides an enhanced design or a light blocking film that is to be adhered onto a surface of the lighting decoration member 42. A material (a synthetic resin) of the lighting decoration member 42 contains particles that disperse light such as particles that provide milky white. Such particles are dispersed in the material of the lighting decoration member 42. Therefore, the light passing through the linear transmissive portion 421 of the lighting decoration member 42 is directed toward the vehicular interior side with being dispersed.

Figure 5:
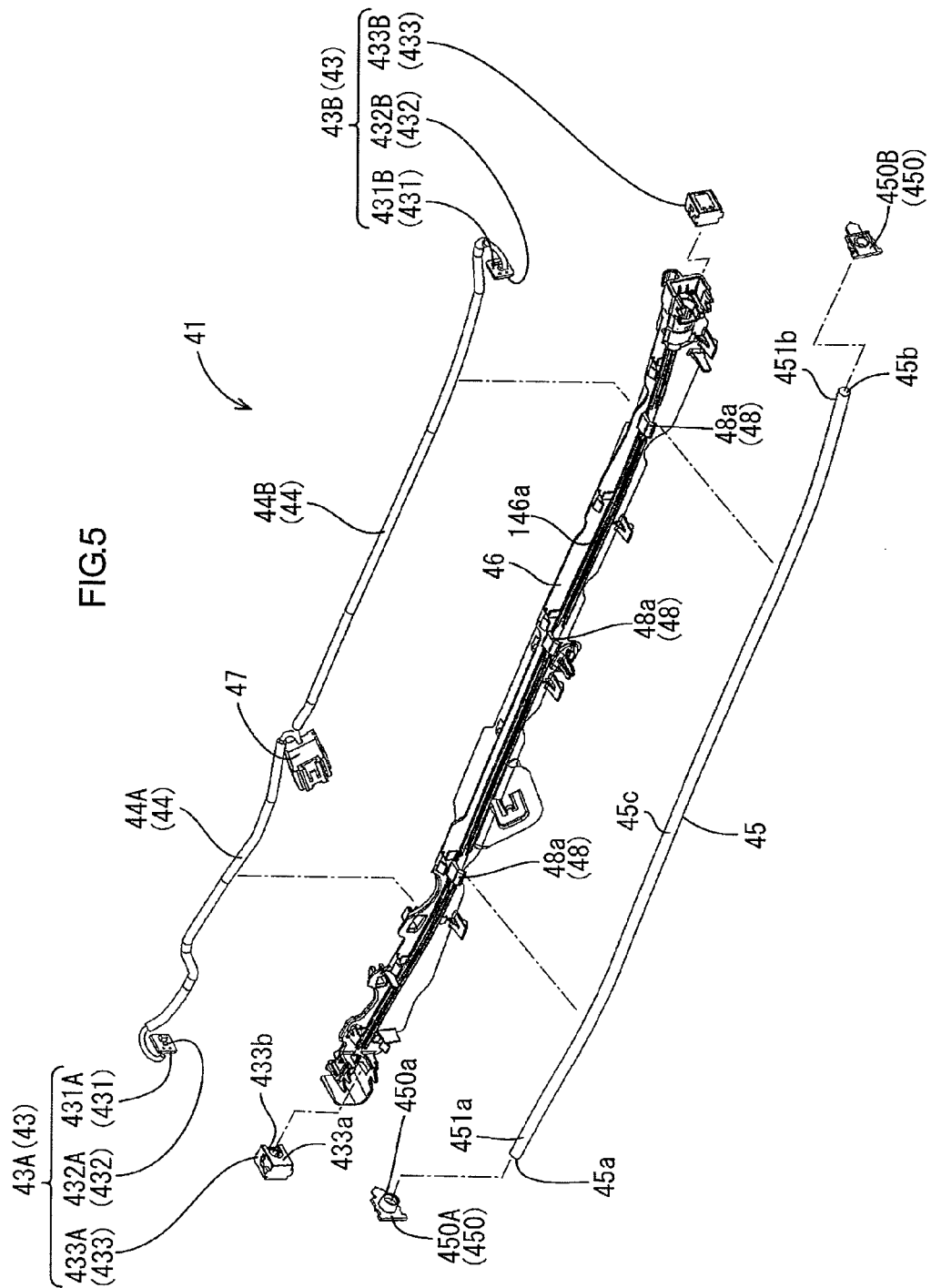
FIG. 5 is an exploded perspective view illustrating a lighting main body seen from the vehicular interior side.

FIG. 5 is an exploded perspective view illustrating the lighting main body 41 seen from the vehicular interior side. As illustrated in FIG. 5, the lighting main body 41 includes a light source unit 43, a wire harness 44, a light guide member 45, a light guide member holder 450, and a cover 46.

The light source unit 43 includes an LED (an example of a light source) 431, an LED board 432 on which the LED 431 is mounted, and a light source container 433 in which the LED 431 and the LED board 432 are arranged. According to the present embodiment, the lighting main body 41 includes a pair of light source units 43 (43A, 43B). One of the light source units 43 (43A) includes an LED 431A, an LED board 432A, and a light source container 433A. Another one of the light source units 43 (43B) includes an LED 431B, an LED board 432B, and a light source container 433B. The light source unit 43A is arranged to face an end surface of the light guide member 45 that is closer to the vehicular front side. The light source unit 43B is arranged to face an end surface of the light guide member 45 that is closer to the vehicular rear side.

The light emitting diode (LED) 431 is connected to power supply (not illustrated) such as a battery installed in a vehicle via the wire harness 44. The LED 431 is turned on (emits light) according to supply of electric power from the power supply. The LED 431 is mounted on one of board surfaces of the LED board 432. Another one of the board surfaces is connected to one end of the wire harness 44.

The light source container 433 is formed in a substantially box shape so as to have the LED 431 mounted on the LED board 432 therein and the light source container 433 is a resin molded product. The light source container 433 has a wall 433a and the wall 433a has an opening 433b that is a through hole. The opening 433b is formed in the wall 433a so as to overlap a light emission surface of the LED 431 arranged in the light source container 433. Light emitting from the LED 431 through the light emission surface passes through the opening 433b and is directed toward the light guide member 45. The cover 46 has an elongated shape so as to cover an elongated light guide member 45. The light source container 433 of the light source unit 43 having the LED 431 therein is arranged on each end of the cover 46 having the elongated shape.

The wire harness 44 includes electric wires that are covered by a tubular insulation member to be bundled. One end of the wire harness 44 is connected to the light source unit 43 and another end of the wire harness 44 is connected to a connector 47. The wire harness 44 includes two wire harnesses 44A, 44B that are connected to the connector 47. The wire harness 44A is connected to the light source unit 43A and the wire harness 44B is connected to the light source unit 43B. The wire harnesses 44A, 44B are arranged on a rear surface side of the cover 46 (refer to FIG. 3).

The light guide member 45 has a bar shape (an elongated shape, a circular columnar shape) that is elongated along the vehicular front-rear direction and has a substantially circular cross section. The light guide member 45 is made of a light guide material having flexibility. The "light guide material" is a material through which light passes and is configured to guide light therein. An example of such a light guide material is acrylic resin. Known light guide materials are described in Japanese Unexamined Patent Publication Nos. 2005-306233 and 6-75120.

One end surface 45a of the light guide member 45 is a light entrance portion 45a which the light from the LED 431A of the light source unit 43A that is arranged on the vehicular front side enters. Another end surface 45b of the light guide member 45 is a light entrance portion 45b which the light from the LED 431B of the light source unit 43B that is arranged on the vehicular rear side enters. According to the present embodiment, light enters the light guide member 45 through the end surfaces 45a, 45b.

An outer peripheral surface (an outer surface) 45c of the light guide member 45 is covered with a layer of fluorine resin, for example. The light that enters the light guide member 45 and is guided therein emits outside from the light guide member 45 through the outer peripheral surface 45c. The light enters the light guide member 45 through the end surfaces 45a, 45b and the light is totally reflected at multiple times while traveling through the light guide member 45 along the longitudinal direction. The light exits outside through the outer peripheral surface 45c while traveling through the light guide member 45. Namely, the outer peripheral surface 45c of the light guide member 45 is a light exit portion 45c through which the light entering through the end surfaces (the light entrance portions) 45a, 45b of the light guide member exits outside the light guide member 45.

The light guide member holder 450 holds an end portion of the light guide member 45 such that the light from the LED 431 enters the end surface (the light entrance portion) of the light guide member 45. The light guide member holder 450 includes a pair of light guide member holders 450A, 450B that hold the end portions 451a, 451b of the light guide member 45, respectively. The light guide member holder 450A holds the vehicular front side end portion 451a of the light guide member 45 and the light from the LED 431A enters the end surface (the light entrance portion) 45a of the light guide member 45. The light guide member holder 450B holds the vehicular rear side end portion 451b of the light guide member 45 and the light from the LED 431B enters the end surface (the light entrance portion) 45b of the light guide member 45.

The light guide member holder 450 has a mount portion 450a that is formed in a cylindrical shape. The end portion of the light guide member 45 is inserted into the mount portion 450a so that the end portion of the light guide member 45 is mounted to the light guide member holder 450. The light guide member holders 450 (450A, 450B) are mounted to the end portions of the cover 46 so as to be adjacent to the light source units 43 (43A, 43B), respectively.

Figure 6:
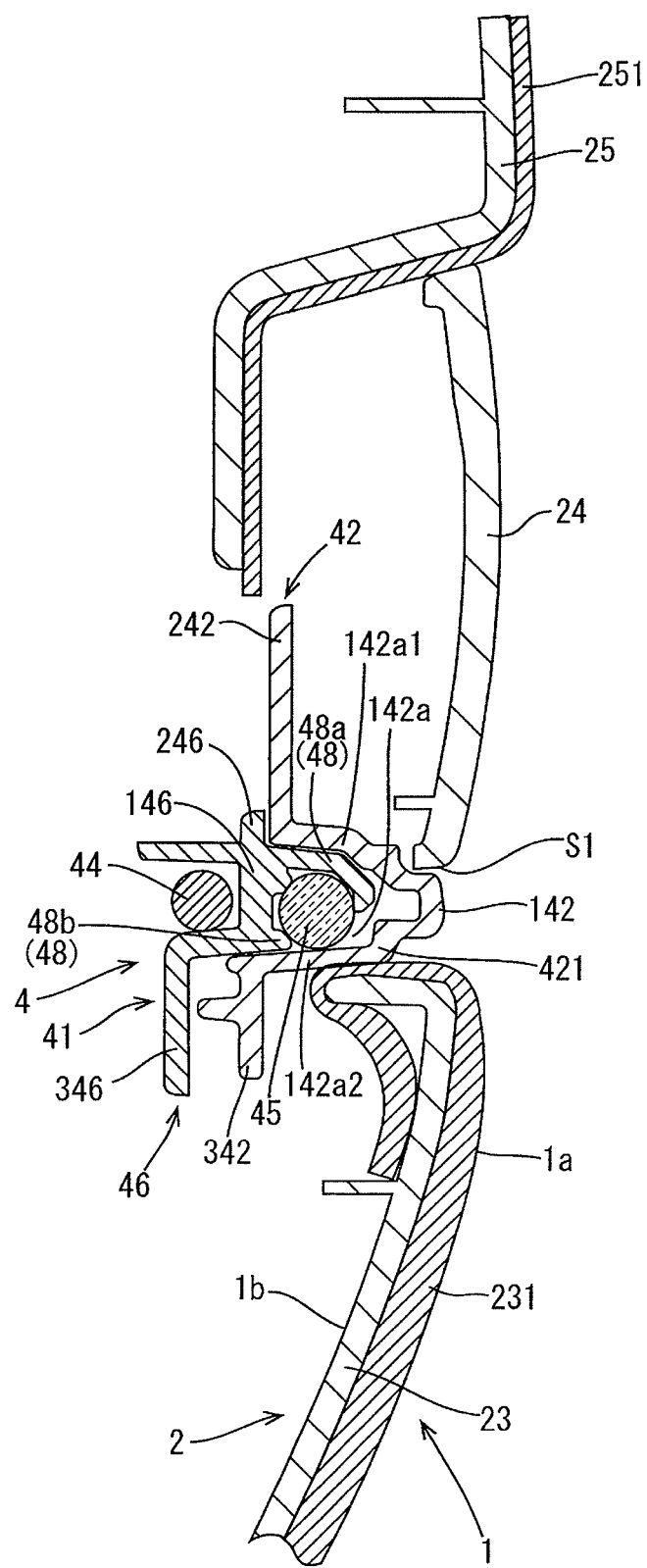
FIG. 6 is a cross-sectional view of the door trim in FIG. 1 taken along an A-A line.

The cover 46 covers the light guide member 45 that is arranged in the recess 142a from the rear side of the lighting decoration member 42. The cover 46 is mounted to the lighting decoration member 42 from the rear side (the vehicular exterior side). As illustrated in FIG. 5, the cover 46 is formed in an elongated shape extending in the vehicular front-rear direction as a whole similar to the light guide member 45. FIG. 6 is a cross sectional view of FIG. 1 taken along an A-A line and the right side in FIG. 6 corresponds to the vehicular interior side and the left side in FIG. 6 corresponds to the vehicular exterior side.

The cover 46 has a surface that faces the vehicular interior side (the front-side surface) and at least the surface facing the vehicular interior side is a light reflection surface that is white. With such a configuration, the light exiting from the light guide member 45 through the outer peripheral surface 45c is reflected by the surface (the light reflection surface) of the cover 46 so as to be directed to the vehicular interior side (toward the linear transmissive portion 421). This improves light use efficiency.

As illustrated in FIG. 6, the cover 46 includes a cover middle portion 146, an upper cover plate portion 246, and a lower cover plate portion 346. The upper cover plate portion 246 has a plate shape extending from an upper end of the cover middle portion 146 toward the vehicular upper side. The lower cover plate portion 346 has a plate shape extending from a lower end of the cover middle portion 146 toward the vehicular lower side.

The cover middle portion 146 has a substantially elongated plate shape (a belt-like shape) extending in the vehicle front-rear direction. The cover middle portion 146 has a front-side plate surface (the front surface) that is a facing surface 146a facing the recess 142a of the lighting decoration member 42. The cover middle portion 146 includes a stopper 48 on its facing surface 146c. The stopper 48 projects and extends from the facing surface 146a toward the recess 142a (the vehicular exterior side) and is fitted to the light guide member 45 and provisionally holds or supports the light guide member 45.

According to the present embodiment, the stopper 48 includes a stopper portion 48a and stopper projections 48b. The stopper portion 48a projects from the facing surface 146a toward the recess 142a and is bent and formed in a hook-like shape so as to be fitted to the outer surface of the light guide member 45 on its inner side surface. The stopper portion 48a projects from an upper end portion of the facing surface 146a of the cover middle portion 146. The stopper portion 48a is fitted to the light guide member 45 with provisionally holding or supporting it from an upper side. The cover middle portion 146 includes a plurality of stopper portions 48a. As illustrated in FIGS. 2 and 5, the stopper portions 48a are arranged on the facing surface 146a in a line along the longitudinal direction of the cover 46 (the cover middle portion 146) at intervals.

A pair of stopper projections 48b are arranged on the facing surface 146a so as to project therefrom toward the recess 142a (the vehicular interior side). Each of the stopper projections 48b extends in the longitudinal direction such that the stopper projections 48b in pair are parallel to each other to form a recess groove therebetween. The recess groove extends in the longitudinal direction of the cover middle portion 146. The stopper projections 48b are fitted to the outer surface of the light guide member 45 from the vehicular exterior side. The stopper projections 48b project from the facing surface 146a of the cover 46 (the cover middle portion 146) and extend along the longitudinal direction of the light guide member 45. As illustrated in FIG. 6, a height of the stopper projection 48b from the facing surface 146a is smaller than that of the stopper portion 48a. The light guide member 45 is provisionally held or supported by the stopper portion 48a and the stopper projections 48b on the facing surface 146a of the cover 46. The light guide member 45 is arranged in a space defined by the stopper portion 48a and the stopper projections 48b. The light guide member 45 that is provisionally held or supported by the stopper 48 (the stopper portion 48a and the stopper projections 48b) is capable of moving slightly in the space. However, the light guide member 45 is held (provisionally) so as not to be dropped off from the stopper 48 even if the lighting main body 41 moves when transporting the lighting main body 41 or mounting the lighting main body 41 to the lighting decoration member 42.

The stopper 48 is configured not to contact the light guide member 45 strongly when the light guide member 45 is provisionally held or supported only by the stopper 48. If the stopper 48 (especially the stopper portion 48a) contacts the outer peripheral surface 45c of the light guide member 45 strongly, the layer formed on the outer peripheral surface 45c of the light guide member 45 may be damaged. If a plate-like member moves circumferentially on the outer peripheral surface 45c of the light guide member 45 with being in contact strongly therewith, the film formed on the outer peripheral surface 45c of the light guide member 45 is easily damaged. If the film formed on the outer peripheral surface 45c of the light guide member 45 is damaged and removed therefrom, the damaged portion causes an error of a bright point and light exiting from the damaged portion of the light guide member 45 becomes brighter than the light from other portions. This may cause uneven brightness in the light exiting from the lighting decoration member 42 through the linear transmissive portion 421. Therefore, according to the present embodiment, the light guide member 45 is held or supported provisionally only by the stopper 48 on the cover 46 side.

After the light guide member 45 is provisionally held (provisionally fixed) by the stopper 48 as described before, the cover 46 is mounted to the lighting decoration member 42. Accordingly, the light guide member 45 that is provisionally held or supported by the stopper 48 is fixed to be in a correct position in the recess 142a. The stopper projections 48b of the stopper 48 are used to fix the light guide member 45 to be in the correct position. The stopper projections 48b project from the facing surface 146a toward the recess 142a (toward the vehicular interior side) and the stopper projections 48b in pair are arranged to be parallel to each other along the longitudinal direction to form the recess groove therebetween. The pair of stopper projections 48b corresponds to a receiver that receives the light guide member 45 from the vehicular exterior side to fix (position) the light guide member 45 to be in the correct position. FIG. 6 illustrates the light guide member 45 that is fixed in the correct position within the recess 142a.

As illustrated in FIG. 6, the wire harness 44 is arranged on the rear side (on the vehicular exterior side) of the cover middle portion 146.

The upper cover plate portion 246 corresponds to an upper portion of the cover 46. When the cover 46 is mounted to the lighting decoration member 42, the upper cover plate portion 246 faces (overlaps) the upper extending plate portion 242 of the lighting decoration member 42 from the rear side (the vehicular exterior side).

The lower cover plate portion 346 corresponds to a lower portion of the cover 46. When the cover 46 is mounted to the lighting decoration member 42, the lower cover plate portion 346 is arranged to face (overlap) the lower extending plate portion 342 of the lighting decoration member 42 from the rear side (the vehicular exterior side).

As illustrated in FIG. 6, the lighting device 4 is arranged on the rear surface 1b side of the trim board 2 (the door trim 1) such that an end portion (a vehicular interior side end portion) of the decoration middle portion 142 of the lighting decoration member 42 can be seen from the vehicular interior side via the space S1 in the trim board 2 (the door trim 1). The decoration middle portion 142 that can be seen via the space S1 includes the linear transmissive portion 421 at its lower end portion. The light exiting from the light guide member 45 transmits through the linear transmissive portion 421 toward the vehicular interior side. A light blocking layer is arranged on a portion of the decoration middle portion 142 that is located on an upper side with respect to the linear transmissive portion 421. An upper end portion of the second armrest board 23 is located on a lower side with respect to the linear transmissive portion 421 so as to be in contact with the lower portion of the linear transmissive portion 421. A vehicular interior side surface of the lower portion of the decoration middle portion 142 that is located on a lower side than the linear transmissive portion 421 or a vehicular interior side surface of the portion extending from the linear transmissive portion 421 toward the vehicular exterior side is in contact with and covered with the upper end portion of the second armrest board 23. No space is formed between the decoration middle portion 142 and the second armrest board 23. With this configuration, the light that exits from the light guide member 45 and transmits through the portion of the decoration middle portion 142 located on a lower side than the linear transmissive portion 421 is blocked by the upper end portion of the second armrest board 23 so as not to transmit through the upper end portion or the second armrest board 23 toward the vehicular interior side.

As illustrated in FIG. 6, a skin 231 is provided on the surface of the second armrest board 23. The skin 231 is in contact with the lower portion of the decoration middle portion 142 that extends from the linear light transmissive portion 421 toward the vehicular exterior side or is a part of the lower wall portion 142a2. As illustrated in FIG. 6, a skin 251 is provided on the surface of the upper board 25.

Figure 7:
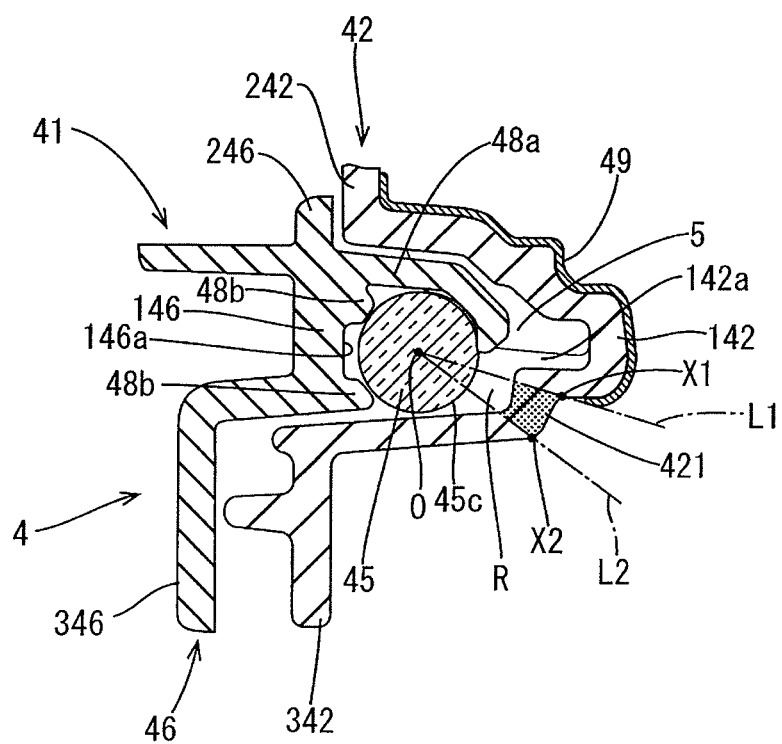
FIG. 7 is an enlarged cross-sectional view of a lighting device illustrated in FIG. 6.

FIG. 7 is an enlarged cross-sectional view of the lighting device 4 in FIG. 6. As illustrated in FIG. 7, in the lighting device 4, the light guide member 45 is sandwiched between the stopper projections 48b of the cover 46 and the guide member 5 of the lighting decoration member 42 with respect to a vehicular width direction. The two stopper projections 48b, 48b that extend in the longitudinal direction of the cover 46 (the cover middle portion 146) are in contact with the rear-side outer peripheral surface 45c of the light guide member 45 along the longitudinal direction of the light guide member 45. An end portion of the guide member 5 is in contact with the front-side outer surface 45c of the light guide member 45 along a circumferential direction of the light guide member 45. Accordingly, the light guide member 45 is fixed laterally.

Figure 8:
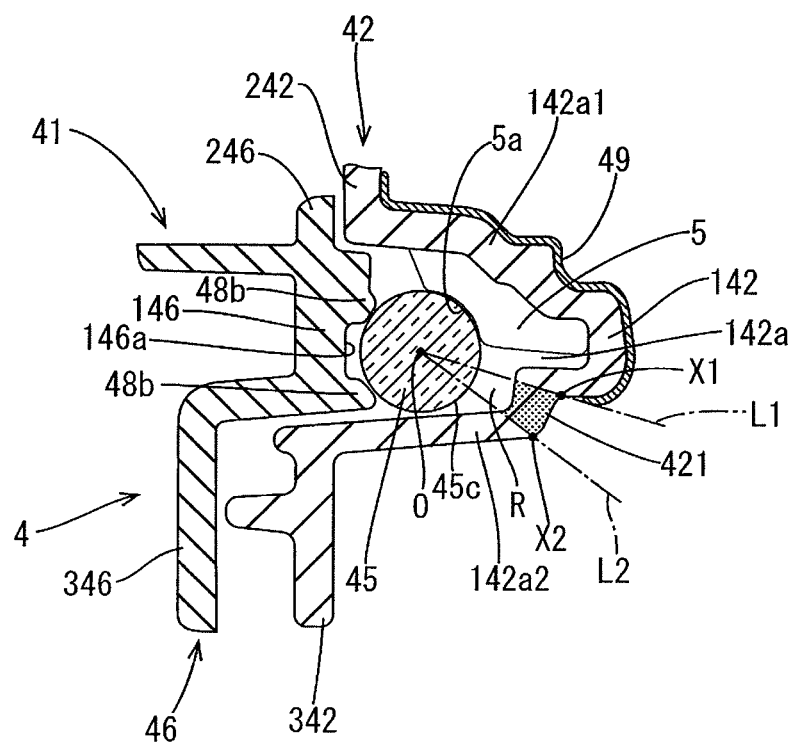
FIG. 8 is a cross-sectional view of the lighting device without including a stopper.

FIG. 8 is a cross-sectional view of the lighting device 4 without illustrating the stopper portion 48a. As illustrated in FIG. 8, the guide member 5 is a plate that projects and extends inwardly from the upper wall portion 142a1 of the recess 142a. The guide member 5 includes the contact portion 5a (contact surface) at its end face (an end portion) that comes in contact with the outer peripheral surface 45c of the light guide member 45 along its circumferential direction. The contact portion 5a has a recessed curved surface following a shape of the outer peripheral surface (outer surface) 45c of the light guide member 45.

When the light guide member 45 is arranged in the correct position within the recess 142a, the light exiting from the light guide member 45 through the outer peripheral surface (the light exit portion) 45c transmits through the linear transmissive portion 421 of the lighting decoration member 42 without being blocked by the stopper 48 (the stopper portion 48a, the stopper projections 48b). Accordingly, the light passes through the linear transmissive portion 421 to be directed toward the vehicular interior side.

As illustrated in FIGS. 7 and 8, a light blocking layer 49 is provided on the surface of a portion of the decoration middle portion 142 that is located on an upper side than the linear transmissive portion 421. A vehicular interior side upper end portion X1 of the linear transmissive portion 421 is located adjacent to the light blocking layer 49. The vehicular interior side upper end portion X1 corresponds to an upper end portion with respect to a short side direction of the linear transmissive portion 421. As illustrated in FIG. 6, the skin 231 covering a surface of the second armrest board 23 is fitted to and in contact with a surface of a portion of the decoration middle portion 142 that is located on a lower side than the linear transmissive portion 421. A vehicular interior side lower end portion X2 of the linear transmissive portion 421 is located adjacent to the skin 231. The vehicular interior side lower end portion X2 corresponds to a lower end portion with respect to a short side direction of the linear transmissive portion 421. The skin 231 has light blocking properties. The decoration middle portion 142 includes the linear transmissive portion 421 in a portion between the light blocking layer 49 and the skin 231.

As illustrated in FIGS. 7 and 8, a line L1 is defined by an imaginary line connecting a center axis O and the vehicular interior side upper portion X1 and a line L2 is defined by an imaginary line connecting the center axis O and the vehicular interior side lower portion X2. An area R is defined by the line L1 and the line L2 within the recess 142a of the lighting device 4. The stopper 48 (the stopper portion 48a, the stopper projections 48b) and the guide member 5 are arranged outside of the area R within the recess 142a of the lighting device 4 such that the stopper 48 (the stopper portion 48a, the stopper projections 48b) and the guide member 5 are not located in the area R that is defined by the lines L1 and L2. The area R is defined within a space between the outer peripheral surface 45c of the light guide member 45 and an inner wall surface of the recess 142a (an inner wall surface of the lighting decoration member 42). The stopper 48 (the stopper portion 48a, the stopper projections 48b) and the guide member 5 are arranged in the recess 142a such that a shadow or a dark portion is not caused in the linear transmissive portion 421. Thus, the stopper 48 (the stopper portion 48a, the stopper projections 48b) and the guide member 5 are arranged only outside of the area R. With such a configuration, a shadow of the stopper 48 or the guide member 5 does not influence (any shadow is not caused in) the light exiting through the linear transmissive portion 421 toward the vehicular interior side. As a result, uneven brightness is less likely to occur in the light exiting from the linear transmissive portion 421.

The stopper projection 48a projects from the cover middle portion 146 so as to support the light guide member 45 from the upper side along the circumferential direction. According to the present embodiment, the stopper portion 48a projects only from an upper portion of the cover middle portion 146. As illustrated in FIG. 7, the cover member 46 includes the stopper portion 48a such that the stopper portion 48a is not located in the area R. The cover member 46 (the cover middle portion 146) also includes the stopper projections 48b such that the stopper projections 48b are not located in the area R.

As illustrated in FIG. 8, the guide member 5 projects mainly from the upper wall portion 142a1 of the decoration middle portion 142 toward an inner space of the recess 142a and such that the guide member 5 is not located in the area R. The correct position of the light guide member 45 in the recess 142a is a position of the light guide member 45 that is arranged in the recess 142a in which neither of the guide member 45 nor the stopper 48 is located between the light guide member 45 and the linear transmissive portion 421. In the correct position, any obstacles that block the light from the light guide member 45 are not located between the light guide member 45 and the linear transmissive portion 421.

A process of mounting the lighting device 4 to the trim board 2 will be described. In the lighting device 4 of the present embodiment, each of the lighting decoration member 42 and the lighting main body 41 is mounted to the trim board 2 independently from each other. According to the present embodiment, when the lighting device 4 is mounted to the trim board 2, only the lighting decoration member 42 is mounted to the trim board 2 first. Then, the lighting main body 41 is mounted to the lighting decoration member 42. The lighting main body 41 is mounted to the lighting decoration member 42 that is mounted to the trim board 2, and accordingly, the assembling of the lighting device 4 and the mounting of the lighting device 4 to the trim board 2 are accomplished.

The lighting decoration member 42 is mounted to a space between the decoration board 24 and the second armrest board 23, when the parts of the trim board 2 are mounted to each other. According to the present embodiment, the lighting decoration member 42 is mounted to the decoration board 24 such that the upper end portion of the lighting decoration member 42 is fitted to the lower end portion of the decoration board 24. The lighting decoration member 42 that is mounted to the decoration board 24 is mounted to the upper end portion of the second armrest board 23.

Then, the lighting main body 41 is mounted from the rear side (from the vehicular exterior side) to the lighting decoration member 42 that is mounted to the trim board 2. The lighting main body 41 previously includes the light guide member 45 that is held by the stopper 48 provisionally. The light guide member 45 that is provisionally held or supported by the stopper 48 is capable of moving slightly in a space defined by the stopper 48.

Figure 9:
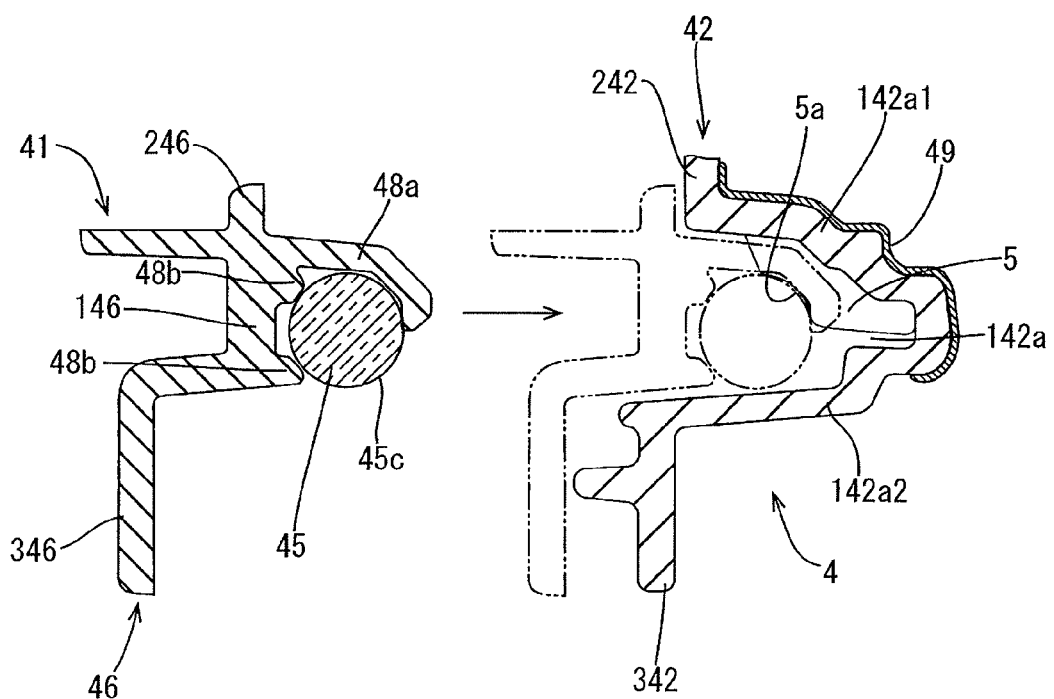
FIG. 9 is a cross-sectional view typically illustrating a process of mounting the lighting main body to the lighting decoration member.

FIG. 9 typically illustrates the process of mounting the lighting main body 41 to the lighting decoration member 42. As is illustrated in a left portion in FIG. 9, the light guide member 45 is held or supported gently by the stopper portion 48a and the stopper projections 48b. Therefore, the light guide member 45 is located slightly closer to the lower one of the stopper projections 48b, 48b due to gravity.

Thus, the lighting main body 41 provisionally holding the light guide member 45 is mounted to the lighting decoration member 42 from the rear side. The light guide member 45 that is provisionally held or supported by the stopper 48 is inserted to the recess 142a from the rear side of the lighting decoration member 42. As the light guide member 45 is gradually inserted into the recess 142a from the rear side toward the front side, the contact portion 5a of the guide member 5 comes in contact with the outer peripheral surface 45c of the light guide member 45. As the light guide member 45 is further inserted into the recess 142a toward the front side (the vehicular interior side), the light guide member 45 that has been located slightly closer to the lower one of the stopper projections 48b, 48b is pushed up toward the vehicular exterior side by the guide member 5 so as to be in contact equally with the two stopper projections 48b, 48b. When the provisionally held light guide member 45 is arranged in the recess 142a, the guide member 5 comes in contact with the outer surface (the outer peripheral surface) 45c of the light guide member 45 and guides the light guide member 45 to the correct position in the recess 142a. The light guide member 45 that is arranged in the correct position is fixed (positioned) with being held by the stopper projections 48b and the guide member 5.

The stopper 48 and the guide member 5 are included in the cover 46 and the lighting decoration member 42, respectively, so as not to be in contact with each other when the lighting main body 41 is mounted to the lighting decoration member 42.

In the lighting device 4 according to the present embodiment, when the light guide member 45 that is provisionally held or supported by the stopper 48 of the cover 46 is inserted into the recess 142a of the lighting decoration member 42, the light guide member 45 comes in contact with the guide member 5 so as to be guided to the correct position in the recess 142a. With such a configuration, in the lighting device 4 according to the present embodiment, the light guide member 45 is surely positioned in the correct position. Therefore, uneven brightness caused by a positional gap of the light guide member 45 is less likely to be caused in the light exiting from the lighting device 4 through the linear transmissive portion 421. In the lighting device according to the present embodiment, regardless of whether the light guide member 45 is provisionally held in a good condition or not, the light guide member 45 can be arranged in the correct position in the recess 142a. Accordingly, the light passing through the linear transmissive portion 421 is likely to be clear.

With the above configuration, in the lighting device 4 according to the present embodiment, the lighting decoration member (decoration member) 42 and the cover 46 that provisionally holds or supports the light guide member 45 are handled separately from each other. For example, after the lighting decoration member 42 is mounted to the trim board 2, the cover 46 is mounted to the lighting decoration member 42. Accordingly, the process (the method) of mounting the lighting device 4 to the trim board 2 can be set freely.

In the lighting device 4 according to the present embodiment, the guide member 5 and the stopper 48 are arranged in only a space of the recess 142a other than the area R. With this configuration, in the lighting device 4, the light exiting from the light exit portion 45c of the light guide member 45 toward the linear transmissive portion 421 is less likely to be blocked by the guide member 5 or the stopper 48. Accordingly, uneven brightness is less likely to be caused in the light that transmits through the linear transmissive portion 421 and is directed toward the vehicular interior side. For example, a dark portion is less likely to be generated in the light. Therefore, in the lighting device 4 according to the present embodiment, a shadow (a dark portion) is less likely to be caused in the linear transmissive portion 421 by the stopper 48 for provisionally holding the light guide member 45 and the guide member 5 for positioning the light guide member 5 in the correct position.

Second Embodiment

Figure 10:
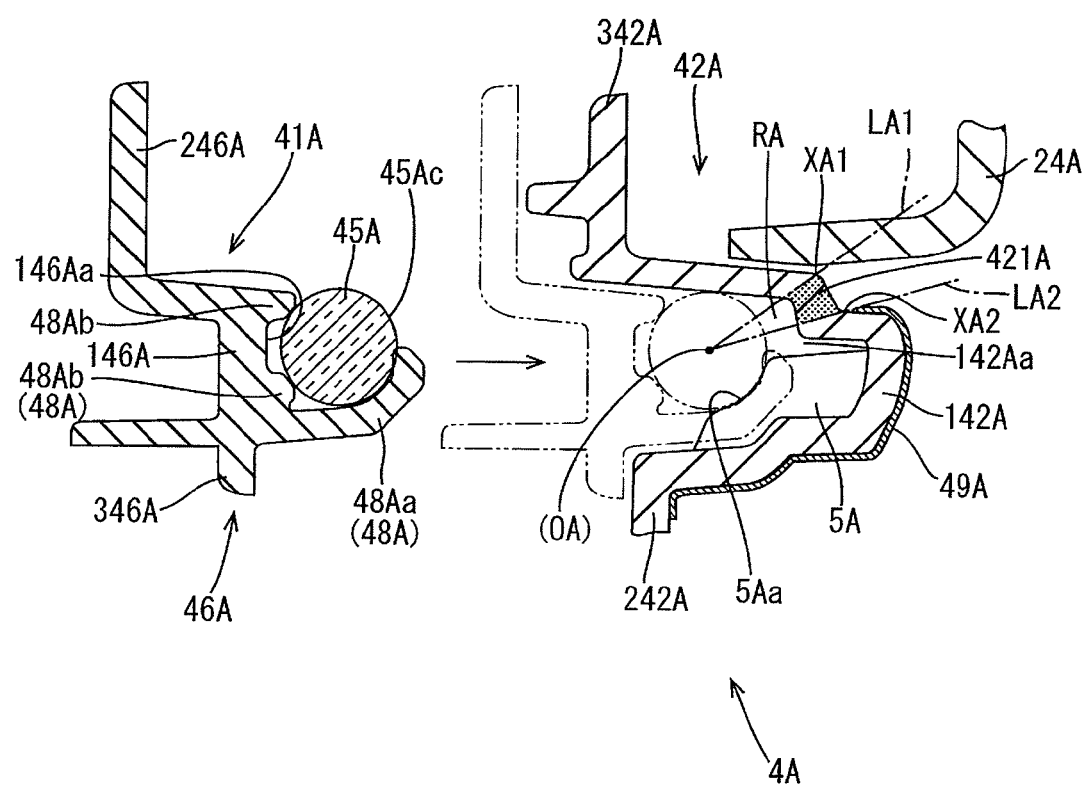
FIG. 10 is a cross-sectional view typically illustrating a process of mounting the lighting main body to a lighting decoration member in a lighting device according to another embodiment.

Next, a second embodiment according to the present technology will be described with reference to FIG. 10. According to the present embodiment, similarly to the first embodiment, a lighting device 4A that is to be mounted to a door trim will be described. FIG. 10 typically illustrates a process of mounting a lighting main body 41A to a lighting decoration member 42A in the lighting device 4A according to the second embodiment. In FIG. 10, each component of the lighting device 4A is represented by a numeral or a symbol by adding "A" to that of a corresponding one of the components of the lighting device 4 according to the first embodiment.

As illustrated in FIG. 10, the lighting device 4A of the present embodiment has a configuration obtained by reversing up-side-down the configuration of the lighting device 4 according to the first embodiment. The lighting main body 41A includes a cover 46A having a facing surface 146Aa. A stopper 48A (a stopper projection 48Aa) for provisionally holding or supporting a light guide member 45A projects and extends from the facing surface 146Aa so as to provisionally hold or support the light guide member 45A from a lower side along a circumferential direction of the light guide member 45A.

In the lighting decoration member 42A, a decoration middle portion 142A includes a linear transmissive portion 421A in its upper portion. An end portion of the decoration board 24A is arranged above a portion of the decoration middle portion 142A that is arranged on an upper side from the linear transmissive portion 421A or extends from the linear transmissive portion 421A toward the vehicular exterior side. A vehicular interior side upper end portion XA1 of the linear transmissive portion 421A is located adjacent to an end portion of the decoration board 24A. A light blocking layer 49A is provided on the surface of a portion of the decoration middle portion 142A that is on a lower side than the linear transmissive portion 421A. A vehicular interior side lower end portion XA2 of the linear transmissive portion 421A is located adjacent to the light blocking layer 49A. The decoration middle portion 142A includes the linear transmissive portion 421A in a portion between the end portion of the decoration board 24A and the light blocking layer 49A.

As illustrated in FIG. 10, a line LA1 is defined by an imaginary line connecting a center axis OA of the light guide member 45A and the vehicular interior side upper portion XA1 and a line LA2 is defined by an imaginary line connecting the center axis OA and the vehicular interior side lower portion XA2. An area RA is defined by the line LA1 and the line LA2 within the recess 142Aa of the lighting device 4A. The stopper 48A (a stopper portion 48Aa, stopper projections 48Ab) and a guide member 5A are arranged outside of the area RA within the recess 142Aa of the lighting device 4A such that the stopper 48A (the stopper portion 48Aa, the stopper projections 48Ab) and the guide member 5A (a guide plate portion) are not located in the area RA that is defined by the lines LA1 and LA2.

According to the lighting device 4A of the present embodiment, the technical operations and effects similar to those of the first embodiment are obtained.

Third Embodiment

Figure 11:
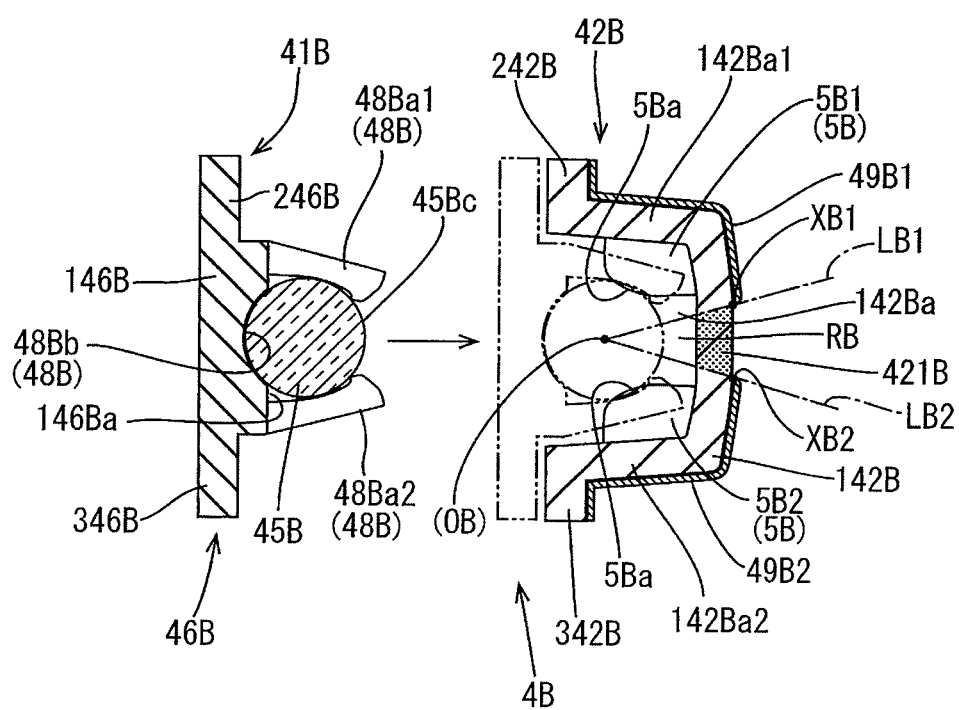
FIG. 11 is a cross-sectional view typically illustrating a process of mounting a lighting main body to a lighting decoration member in a lighting device according to another different embodiment.
Figure 12:
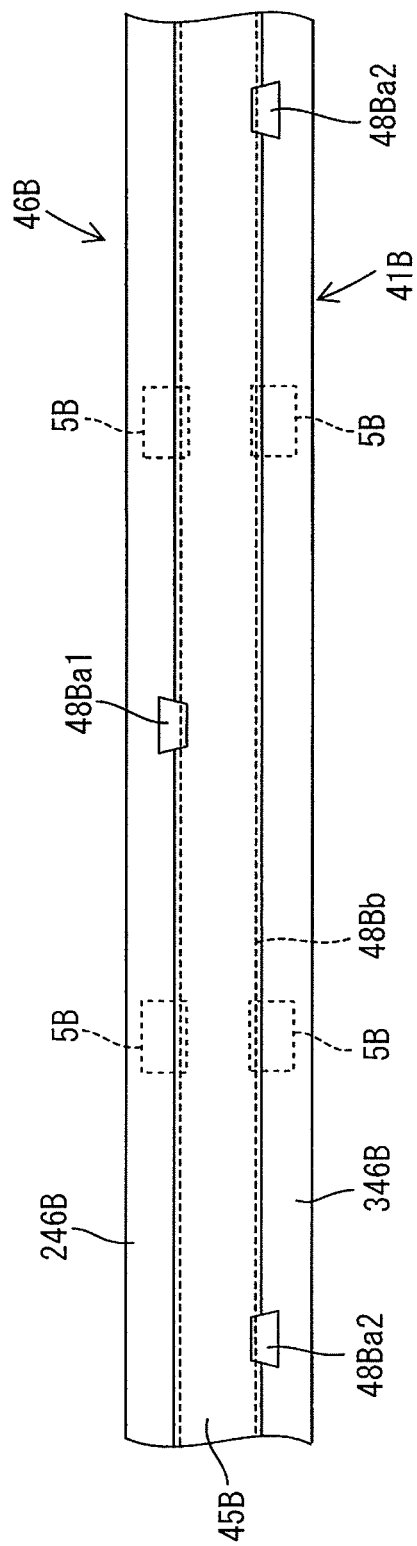
FIG. 12 is a plan view illustrating a lighting main body seen from a front side according to another different embodiment.

Next, a third embodiment according to the present technology will be described with reference to FIGS. 11 and 12. According to the present embodiment, a lighting device 4B that is mounted to a door trim will be described similarly to the first embodiment. FIG. 11 typically illustrates a process of mounting a lighting main body 41B to a lighting decoration member 42B in the lighting device 4B according to the third embodiment. FIG. 12 is a plan view illustrating the lighting main body 41B according to the third embodiment seen from the front side. In FIGS. 11 and 12, each component of the lighting device 4B is represented by a numeral or a symbol by adding "B" to that of a corresponding one of the components of the lighting device 4 according to the first embodiment.

As illustrated in FIG. 11, in the lighting device 4B according to the present embodiment, the lighting main body 41B includes a cover 46B that has a facing surface 146Ba. The cover 46B includes a stopper 48B on its facing surface 146Ba. The stopper 48B includes an upper stopper portion 48Ba1 and a lower stopper portion 48Ba2 and provisionally holds or supports a light guide member 45B from an upper side and a lower side. The stopper 48B provisionally holds or supports the light guide member 45B along its circumferential direction. As illustrated in FIG. 12, stopper portions 48Ba1 are provided on a front-side upper portion of the cover 46B (a cover middle portion 146B) such that the stopper portions 48Ba1 hold the light guide member 45B from the upper side along its circumferential direction. Stopper portions 48Ba2 are provided on a front-side lower portion of the cover 46B (the cover middle portion 146B) such that the stopper portions 48Ba2 hold the light guide member 45B from the lower side. The upper stopper portions 48Ba1 and the lower stopper portions 48Ba2 are arranged so as not to oppose each other with having the light guide member 45B therebetween. The upper stopper portions 48Ba1 and the lower stopper portions 48Ba2 are arranged in a staggered arrangement along the longitudinal direction of the cover 46B. According to the present embodiment, the light guide member 45B is not held provisionally only one of a set of the upper stopper portions 48Ba1 and a set of the lower stopper portions 48Ba2 but is held provisionally between the upper stopper portion 48Ba1 and the lower stopper portion 48Ba2. Thus, the upper stopper portions 48Ba1 and the lower stopper portions 48Ba2 are arranged in a staggered arrangement, and with such a configuration, the stopper portions 48Ba1, 48Ba2 are less likely to be in contact with the light guide member 45B strongly.

The cover 46B includes a recessed receiver 48Bb on its front surface. The receiver 48Bb is used as a stopper 48B for provisionally holding or supporting the light guide member 45B. The receiver 48Bb is used for fixing the light guide member 45B in a correct position.

The lighting decoration member 42B includes a linear transmissive portion 421B in a middle portion of a decoration middle portion 142B. A light blocking layer 49B1 is provided on a surface of a portion of the decoration middle portion 142B that is located on an upper side than the linear transmissive portion 421B. A vehicular interior side upper end portion XB1 of the linear transmissive portion 421B is located adjacent to the light blocking layer 49B 1. A light blocking layer 49B2 is provided on a surface of a portion of the decoration middle portion 142B that is located on a lower side than the linear transmissive portion 421B. A vehicular interior side lower end portion XB2 of the linear transmissive portion 421B is located adjacent to the light blocking layer 49B2. The decoration middle portion 142B includes the linear transmissive portion 421B in a portion between the light blocking layer 49B1 and the light blocking layer 49B2.

The lighting decoration member 42B has a recess 142Ba defined by an upper wall portion 142Ba1 and a lower wall portion 143Ba2. The upper wall portion 142Ba1 includes guides 5B1 projecting and extending inwardly to a space within the recess 142Ba from an inner surface of the upper wall portion 142Ba1. The lower wall portion 142Ba2 includes guides 5B2 projecting and extending inwardly to the space within the recess 142Ba from an inner surface of the lower wall portion 142Ba2. The guide member 5B according to the present embodiment includes the guides 5B1 that are in contact with an upper portion of an outer peripheral surface 45Bc of the light guide member 45B and the guides 5B2 that are in contact with a lower portion of the outer peripheral surface 45Bc. As illustrated in FIG. 12, each of the guide members 5B has a shape extending in the longitudinal direction of the light guide member 45B. With such a configuration, each of the guide members 5B has a contact surface that is in contact with the outer peripheral surface 45Bc of the light guide member 45B with a contact area greater than the guide member 5, 5A in the first embodiment and the second embodiment.

As illustrated in FIG. 11, a line LB1 is defined by an imaginary line connecting a center axis OB of the light guide member 45B and the vehicular interior side upper portion XB1 and a line LB2 is defined by an imaginary line connecting the center axis OB and the vehicular interior side lower portion XB2. An area RB is defined by the line LB1 and the line LB2 within the recess 142Ba of the lighting device 4B. The stopper 48B (a stopper portion 48Ba1, a stopper portion 48Ba2, the receiver 48Bb) and the guide member 5B (the guides 5B1, 5B2) are arranged outside of the area RB within the recess 142Ba of the lighting device 4B such that the stopper 48B (the stopper portion 48Ba1, the stopper portion 48Ba2, the receiver 48Bb) and the guide member 5B (the guides 5B1, 5B2) are not located in the area RB that is defined by the lines LB1 and LB2.

According to the lighting device 4B of the present embodiment, the technical operations and effects similar to those of the first embodiment are obtained.

Fourth Embodiment

Figure 13:
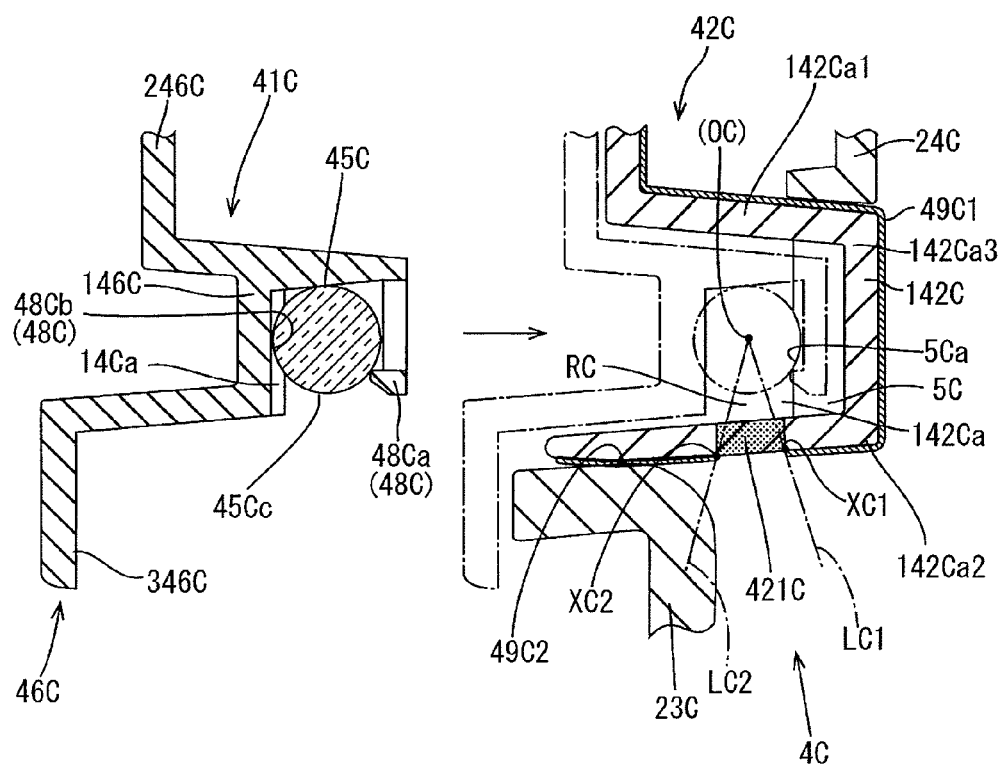
FIG. 13 is a cross-sectional view typically illustrating a process of mounting a lighting main body to a lighting decoration member in a lighting device according to another different embodiment.

A fourth embodiment according to the present technology will be described with reference to FIG. 13. According to the present embodiment, a lighting device 4C that is mounted to a door trim will be described similarly to the first embodiment. FIG. 13 typically illustrates a process of mounting a lighting main body 41C to a lighting decoration member 42C in the lighting device 4C according to the fourth embodiment. In FIG. 13, each component of the lighting device 4C is represented by a numeral or a symbol by adding "C" to that of a corresponding one of the components of the lighting device 4 according to the first embodiment.

As illustrated in FIG. 13, in the lighting device 4C according to the present embodiment, the lighting main body 41C includes a cover 46C that has a facing surface 146Ca. The cover 46C includes a stopper 48C (a stopper portion 48Ca) on its facing surface 146Ca. The stopper 48C provisionally holds or supports a light guide member 45C from an upper side along its circumferential direction. The cover 46C (a cover middle portion 146C) has a receiver 48Cb on its front side. The receiver 48Cb is used to fix the light guide member 45C in a correct position. The cover 46C has a space between the stopper portion 48Ca and the receiver 48Cb and the light guide member 45C is arranged in the space. The space is open downwardly. According to the present embodiment, the light guide member 45C is mounted to the stopper 48C of the cover 46C from a lower side via the opening of the stopper 48C.

The lighting decoration member 42C includes a linear transmissive portion 421C in a lower portion of a decoration middle portion 142C. A light blocking layer 49C1 is provided on a surface of a portion of the decoration middle portion 142C that is located on an upper side and on a front side than the linear transmissive portion 421C. A vehicular interior side upper end portion XC1 of the linear transmissive portion 421C is located adjacent to the light blocking layer 49C1. A light blocking layer 49C2 is provided on a surface of a portion of the decoration middle portion 142C that is located on a lower side and on a rear side than the linear transmissive portion 421C. A vehicular interior side lower end portion XC2 of the linear transmissive portion 421C is located adjacent to the light blocking layer 49C2. The decoration middle portion 142C includes the linear transmissive portion 421C in a portion between the light blocking layer 49C1 and the light blocking layer 49C2. According to the present embodiment, a lower wall portion 142Ca2 of the lighting decoration member 42C includes the linear transmissive portion 421C.

The lighting decoration member 42C includes a recess 142Ca defined by an upper wall portion 142Ca1, a lower wall portion 142Ca2, and a wall portion 142Ca3 provided between the upper wall portion 142Ca1 and the lower wall portion 142Ca2. The wall portion 142Ca3 includes guide members 5C that project and extend therefrom inwardly to an inner space of the recess 142Ca. The guide member 5C includes a contact portion 5Ca (contact surface) on its end portion that faces a rear side (the vehicular exterior side) and comes in contact with an outer peripheral surface 45Cc of a light guide member 45C. The guide member 5C is provided in the recess 142Ca so as to extend from the upper wall portion 142Ca1 to the lower wall portion 142Ca2.

As illustrated in FIG. 13, a line LC1 is defined by an imaginary line connecting a center axis OC of the light guide member 45C and the vehicular interior side upper portion XC1 and a line LC2 is defined by an imaginary line connecting the center axis OC and the vehicular interior side lower portion XC2. An area RC is defined by the line LC1 and the line LC2 within the recess 142Ca of the lighting device 4C. The stopper 48C (a stopper portion 48Ca, a receiver 48Cb) and the guide member 5C are arranged outside of the area RC within the recess 142Ca of the lighting device 4C such that the stopper 48C (the stopper portion 48Ca, the receiver 48Cb) and the guide member 5C are not located in the area RC that is defined by the lines LC1 and LC2.

According to the lighting device 4C of the present embodiment, the technical operations and effects similar to those of the first embodiment are obtained.

Other Embodiments

The present technology is not limited to the description as described above with reference to the drawings. For example, the present technology may include following embodiments.

(1) The lighting devices according to the first to fourth embodiments are used in the door trim. However, a lighting device of the present technology may be used for any other interior parts such as a vehicular interior part.

(2) In the lighting devices according to the first to fourth embodiments, the light guide member has a bar-like shape having a substantially circular cross section (with respect to a short direction). However, for example, a light guide member may have a bar-like shape having any other cross sectional shapes such as a quadrilateral shape (a trapezoidal shape, a square shape, a rectangular shape) or an ellipsoidal shape. A center axis of the light guide member may be set to be a center of circumscribed circle of the cross sectional shape.

(3) In the first, second and fourth embodiments, the guide member is a guide plate portion that has a plate shape and projects and extends inwardly toward an inner space of the recess from a portion of the recess and is in contact with the light guide member at its end portion. The present technology is not limited thereto. For example, a guide member may have a shape extending along a longitudinal direction of the light guide member and may be a guide surface portion that is in contact with the light guide member along the longitudinal direction, as is similar to the configuration of the guide member 5B in FIG. 12. The guide surface portion that is the guide member may have a non-contact portion that may be a cut out portion or a recess such that the stopper (the stopper portion) provided on the facing surface of the cover does not come in contact with the guide surface when the lighting main body is mounted to the lighting decoration member (the decoration member). A longitudinal length of the guide surface (in a longitudinal direction of the lighting decoration member) may be set such that the guide surface does not come in contact with the stopper (the stopper portion) when the lighting main body is mounted to the lighting decoration member (the decoration member).

In the third embodiment, the guide member 5B projects and extends inwardly to the space within the recess 142Ba from the inner surface of the upper wall portion 142Ba1 or the lower wall portion 142Ba2 and has a shape extending in the longitudinal direction of the light guide member 45B. However, the guide member 5B may have a plate-like shape similar to the guide member 5 in the first embodiment. Further, the guide member may have a shape extending longer than the guide member 5B and a length of the guide member may be set such that the guide surface does not come in contact with the stopper when the lighting main body is mounted to the lighting decoration member. The guide surface portion of the guide member 5B may have a non-contact portion that may be a cut out portion or a recess such that the stopper provided on the facing surface of the cover does not come in contact with the guide surface when the lighting main body is mounted to the lighting decoration member.

What is claimed is:

1. A lighting device comprising:
a light source;
an elongated light guide member having an end surface which light from the light source enters, the light guide member emitting light entering through the end surface;
an elongated decoration member arranged along a longitudinal direction of the light guide member, the elongated decoration member defining a boundary of a recess from an opening of the elongated decoration member to an interior of the elongated decoration member, the recess extending along a longitudinal direction of the decoration member and having an opening, the elongated decoration member including:
a guide member projecting into the boundary of the recess, the guide member being in contact with the light guide member to guide the light guide member to a predetermined position; and
a linear transmissive portion extending linearly and provided along the longitudinal direction of the light guide member such that a rear side of the linear transmissive portion faces the light guide member, light emitted from the light guide member transmits from the rear side through the linear transmissive portion toward a front side of the linear transmissive portion, and
a cover covering the light guide member from a rear side with respect to the decoration member, the cover having a facing surface facing the decoration member and a stopper extending from the facing surface into the boundary of the recess, the stopper provisionally supports the light guide member, wherein
the guide member guides the light guide member that is provisionally supported by the stopper of the cover to the predetermined position when the light guide member supported by the stopper of the cover is arranged within the boundary of the recess through the opening of the recess, the light guide member is arranged in the recess and within the boundary of the recess and is supported by the stopper, and the light guide member is arranged at the predetermined position within the boundary of the recess while being held by the stopper and the guide member, while being in contact with the stopper and the guide member, and while the opening of the recess is closed by the cover.

2. The lighting device according to claim 1, wherein the guide member is one of a guide plate portion and a guide surface portion, the guide plate portion has a plate shape and has a contact surface at an end that is in contact with the light guide member, and the guide surface portion extends in an elongation direction of the light guide member and has a contact surface having an elongated shape that is in contact with the light guide member along the elongation direction of the light guide member.

3. The lighting device according to claim 1, wherein the stopper includes a stopper portion that extends toward the recess and supports an outer surface of the light guide member.

4. The lighting device according to claim 1, wherein the stopper extends from the facing surface along one direction so as to support the light guide member along a circumferential direction of the light guide member from one side.

5. The lighting device according to claim 1, wherein when the light guide member is arranged within the boundary of the recess, the stopper and the guide member are arranged outside an area that is defined, in part, by lines, one of the lines connects a center axis of the light guide member and one end of the linear transmissive portion and another of the lines connects the center axis and another end of the linear transmissive portion.

6. The lighting device according to claim 1, wherein the lighting device is mounted to a vehicular interior part.

7. The lighting device according to claim 1, wherein the linear transmissive portion defines a part of the boundary of the recess.

8. The lighting device according to claim 1, wherein any obstacles that block the light from the light guide member are not located between the linear transmissive portion and the light guide member that is arranged in the recess and supported by the stopper.

9. The lighting device according to claim 1, wherein
the stopper includes a plurality of stoppers that are arranged in the longitudinal direction of the cover, and
the guide member includes a plurality of guide members that are arranged in the longitudinal direction of the decoration member.

10. A lighting device comprising:
a light source;
an elongated light guide member having an end surface which light from the light source enters, the light guide member emitting light entering through the end surface;
an elongated decoration member arranged along a longitudinal direction of the light guide member, the elongated decoration member defining a boundary of a recess disposed within an interior of the elongated decoration member and extending along a longitudinal direction of the decoration member and having an opening, the elongated decoration member including:
a plurality of guide members projecting into the boundary of the recess, the plurality of guide members being in contact with the light guide member to guide the light guide member to a predetermined position; and
a linear transmissive portion extending linearly and provided along the longitudinal direction of the light guide member such that a rear side of the linear transmissive portion faces the light guide member, light emitted from the light guide member transmits from the rear side through the linear transmissive portion toward a front side of the linear transmissive portion, and
a cover covering the light guide member from a rear side with respect to the decoration member, the cover having a facing surface facing the decoration member and a plurality of stoppers extending from the facing surface and into the boundary of the recess and provisionally supporting the light guide member, wherein
the plurality of guide members guide the light guide member that is provisionally supported by the plurality of stoppers of the cover to the predetermined position when the light guide member supported by the plurality of stoppers of the cover is arranged in the recess,
the plurality of stoppers are arranged in a longitudinal direction of the cover,
the plurality of guide members are arranged in the longitudinal direction of the decoration member, and
the plurality of stoppers and the plurality of guide members are arranged so as not to be in contact with each other in the recess.

11. A lighting device comprising:
a light source;
an elongated light guide member having an end surface through which light from the light source enters, the light guide member having an outer peripheral surface from which the light entering through the end surface exits;
an elongated cover having a cover main portion and a stopper projecting from the cover main portion, the stopper of the elongated cover being in contact with and supporting the light guide member,
an elongated decoration member arranged along a longitudinal direction of the light guide member, the elongated decoration member defining a boundary of a recess from an opening of the elongated decoration member to an interior of the elongated decoration member, the recess extending along a longitudinal direction of the decoration member and having an opening, the elongated decoration member including:
an inner surface and a guide member projecting from the inner surface into the boundary of the recess; and
a linear transmissive portion extending linearly along the longitudinal direction of the decoration member, wherein
the recess defined by the elongated decoration member is configured to receive, within the boundary of the recess, the light guide member that is supported by the stopper of the elongated cover such that:
the guide member of the elongated decoration member and the stopper are in contact with the light guide member and hold the light guide member in a predetermined position and the opening of the recess is closed by the cover; and the linear transmissive portion of the elongated decoration member extends linearly along the longitudinal direction of the light guide member such that a rear side of the linear transmissive portion faces the light guide member and the light exiting from the light guide member transmits through the linear transmissive portion.

12. The lighting device according to claim 11, wherein the guide member is one of a guide plate portion and a guide surface portion,
the guide plate portion has a plate shape and has a contact surface at an end that is in contact with the light guide member, and
the guide surface portion extends in an elongation direction of the light guide member and has a contact surface having an elongated shape that is in contact with the light guide member along the elongation direction of the light guide member.

13. The lighting device according to claim 11, wherein the stopper includes a stopper portion that extends within the boundary of the recess and supports an outer surface of the light guide member.

14. The lighting device according to claim 11, wherein the stopper extends from a facing surface facing the decoration member along one direction so as to support the light guide member along a circumferential direction of the light guide member from one side.

15. The lighting device according to claim 11, wherein the stopper and the guide member that are in contact with and support the light guide member in the predetermined position are arranged outside an area that is defined, in part, by a line that connects a center axis of the light guide member and one side edge of the linear transmissive portion and a line that connects the center axis and another side edge of the linear transmissive portion.

16. The lighting device according to claim 11, wherein any obstacles that block the light from the light guide member are not located between the linear transmissive portion and the light guide member that is arranged in the recess and supported by the stopper.

17. The lighting device according to claim 11, wherein
the stopper includes a plurality of stoppers that are arranged in the longitudinal direction of the cover, and
the guide member includes a plurality of guide members that are arranged in the longitudinal direction of the decoration member.

18. The lighting device according to claim 17, wherein the plurality of stoppers and the plurality of guide members are arranged so as not to be in contact with each other in the recess.

19. A lighting device comprising:
a light source;
an elongated light guide member having an end surface which light from the light source enters, the light guide member emitting light entering through the end surface;
an elongated decoration member arranged along a longitudinal direction of the light guide member, the elongated decoration member including:
a light guide member receiving portion having a U-shape and being defined by an upper wall portion and a lower wall portion of the elongated decoration member, the light guide member receiving portion having an opening that receives the light guide member therein and the light guide member receiving portion extending along a longitudinal direction of the elongated decoration member;
a guide member projecting from the upper wall portion into the U-shape of the light guide member receiving portion, the guide member being in contact with the light guide member to guide the light guide member to a predetermined position; and
a linear transmissive portion extending linearly and provided along the longitudinal direction of the light guide member such that a rear side thereof faces the light guide member, light emitted from the light guide member transmits from the rear side toward a front side of the linear transmissive portion, and
a cover covering the light guide member from a rear side with respect to the elongated decoration member, the cover having a facing surface facing the elongated decoration member and a stopper extending from the facing surface toward the light guide member receiving portion and provisionally supporting the light guide member, wherein
the guide member guides the light guide member that is provisionally supported by the stopper of the cover to the predetermined position when the light guide member supported by the stopper of the cover is arranged in the light guide member receiving portion through the opening of the light guide member receiving portion, and
the light guide member is arranged at the predetermined position in the light guide member receiving portion while being held by the stopper and the guide member, and while the opening of the light guide member receiving portion is closed by the cover.

20. The lighting device according to claim 19, wherein
the stopper includes a plurality of stoppers that are arranged in the longitudinal direction of the cover,
the guide member includes a plurality of guide members that are arranged in the longitudinal direction of the decoration member, and
the plurality of stoppers and the plurality of guide members are arranged so as to be in contact with each other in the light guide member receiving portion.

* * * * *